UNITED STATES PATENT OFFICE.

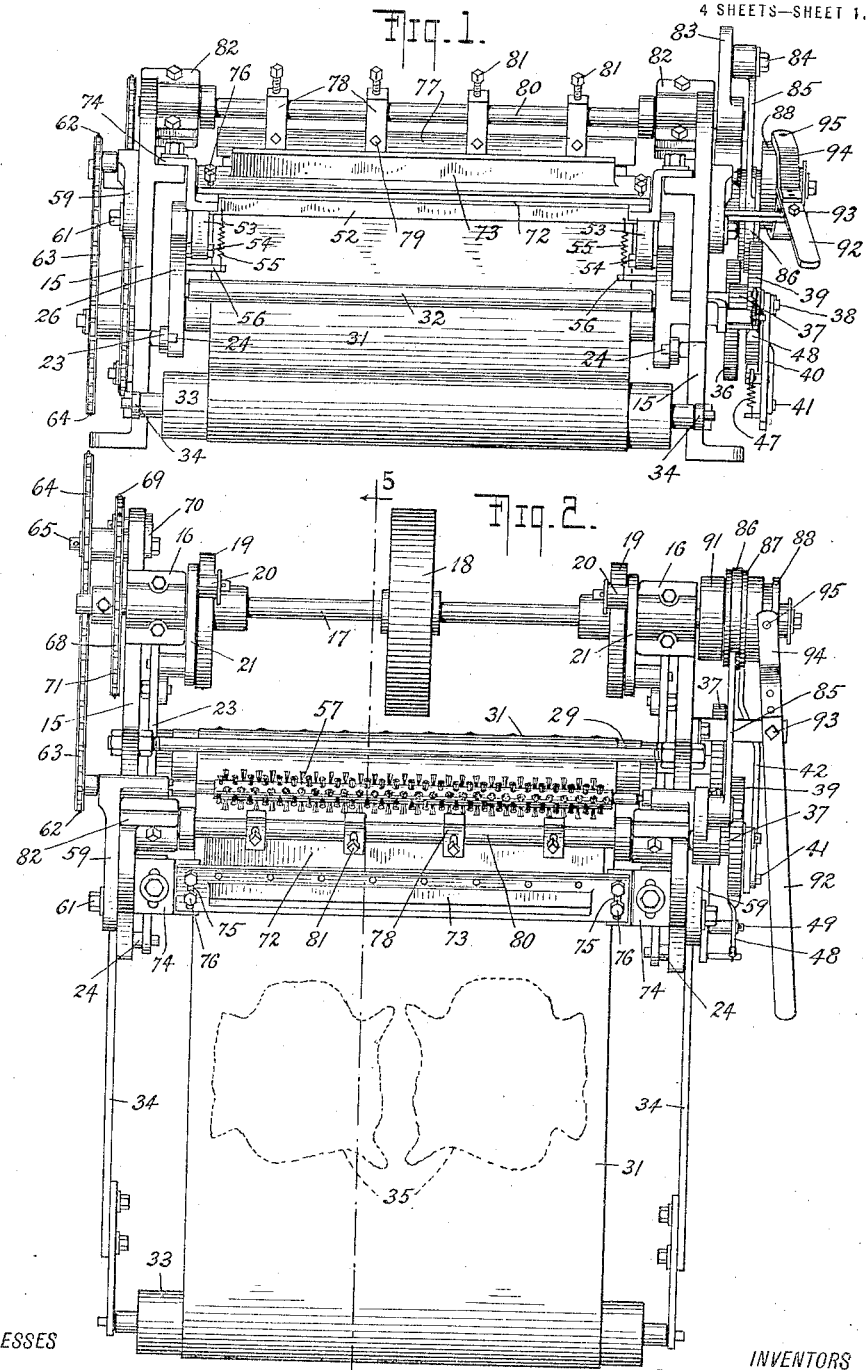

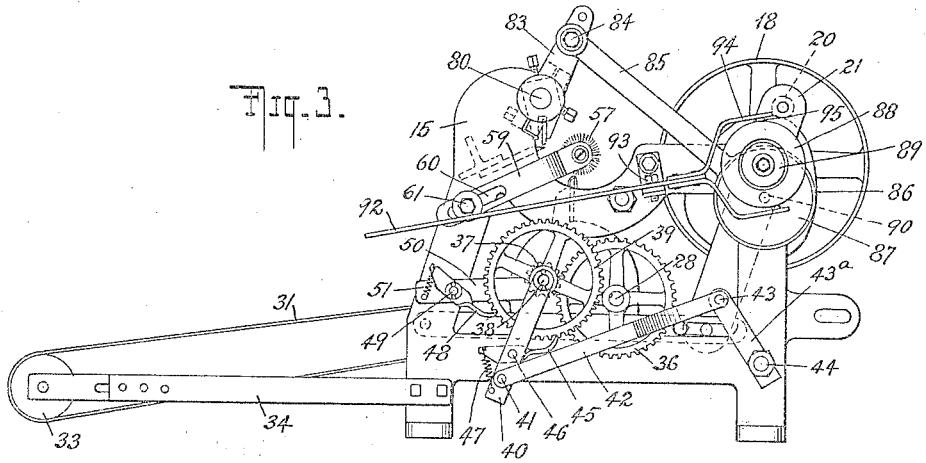
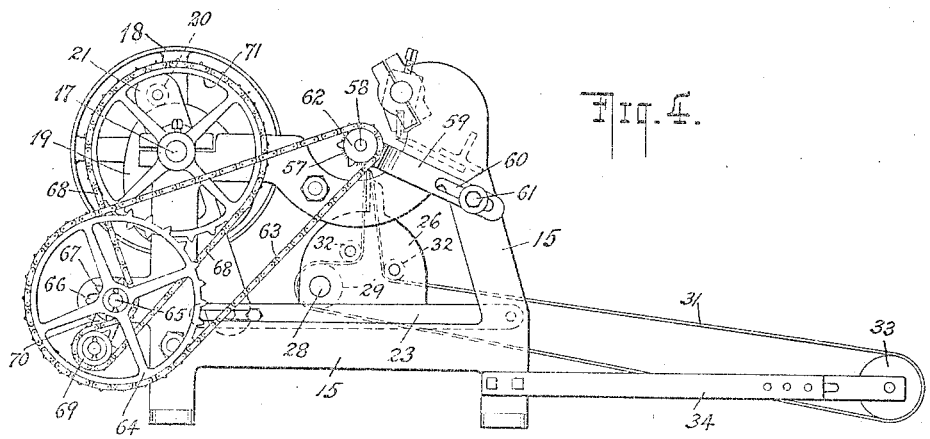

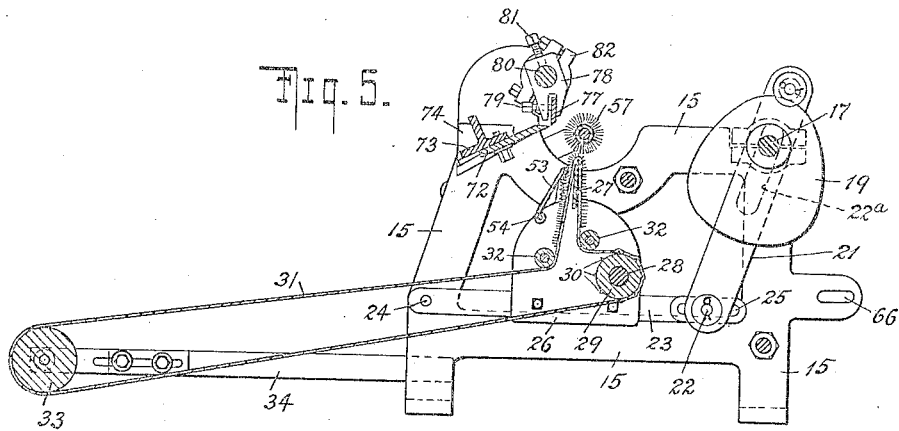
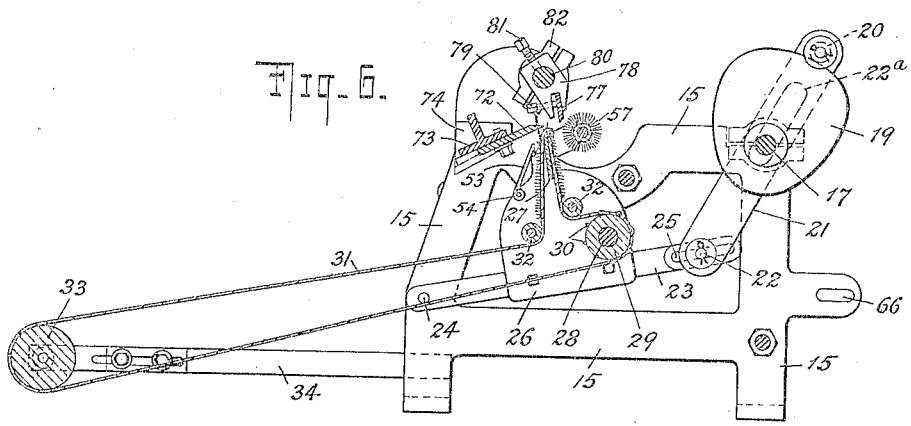

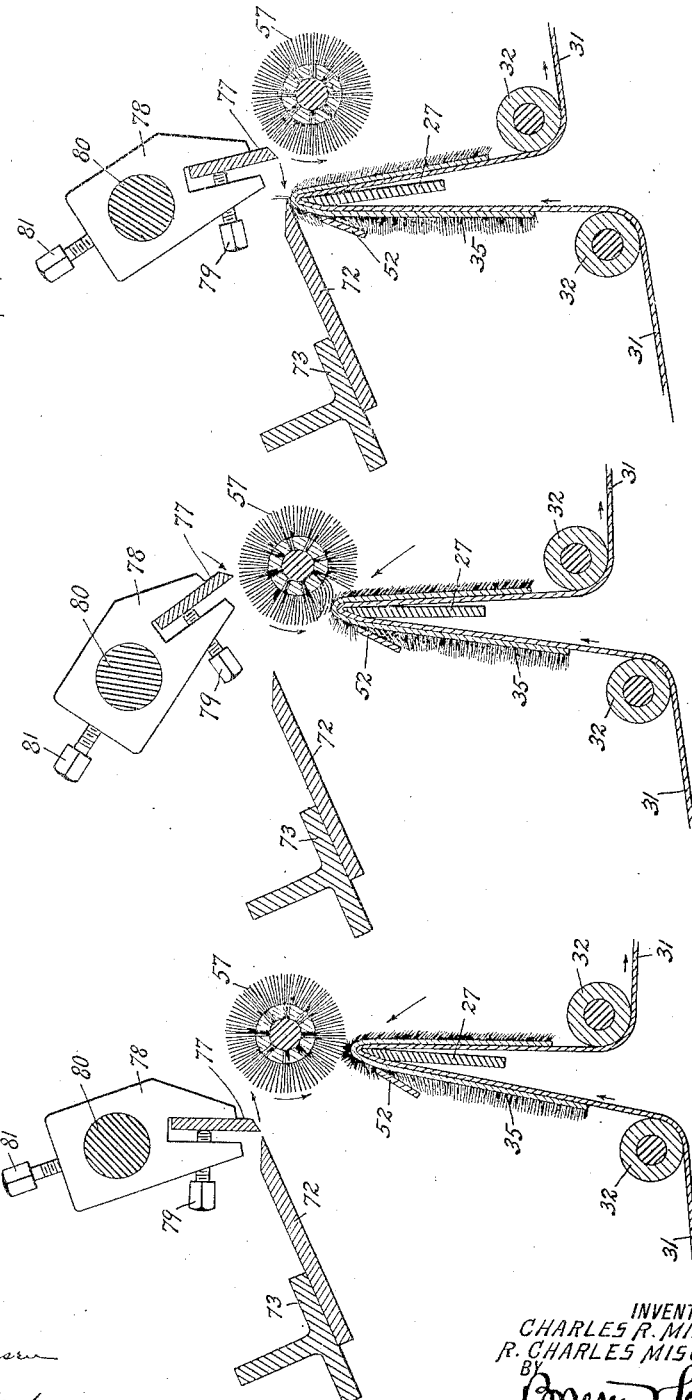

CHARLES REINHART MISCHKE AND REINHARDT CHARLES MISCHKE, OF BROOKLYN, NEW YORK.

UNHAIRING-MACHINE.

1,329,793.  Specification of Letters Patent.  Patented Feb. 3, 1920.

Application filed November 21, 1918. Serial No. 263,497.

*To all whom it may concern:*

Be it known that we, CHARLES R. MISCHKE and REINHARDT CHARLES MISCHKE, both citizens of the United States, and residents of the borough of Brooklyn, county of Kings, city and State of New York, have invented certain new and useful Improvements in Unhairing-Machines, of which the following is a specification.
Our invention relates to machines for unhairing pelts or, in other words, for removing the stiff or water hairs from the skins of fur-bearing animals whereby the quality of the fur and its value from a commercial standpoint is increased. The object of our invention is to provide a machine of the indicated type in which the mechanism is extremely simple in construction and arrangement and whereby the pelts are unhaired in an efficient manner and without mutilation of the pelt itself. Other more specific objects will appear from the description hereinafter and the features of novelty will be pointed out in the appended claims.
In the accompanying drawings, which for illustrative and descriptive purposes show an example of our invention, Figure 1 is a front elevation of the machine; Fig. 2 is a plan view; Figs. 3 and 4 are side elevations looking from opposite directions; Fig. 5 is a sectional view on the line 5—5 of Fig. 2; Fig. 6 is a similar view showing the parts in different positions, and Figs. 7, 8 and 9 are enlarged detail views illustrating various steps in the operation of the machine.

As shown in the illustrated example, the machine comprises a frame 15 of suitable form and construction, and provided with bearings 16 in which a power or main shaft 17 is journaled. The latter is driven in any convenient manner as by means of a pulley 18, which in practice, is connected by means of belt with a motor or other driving mechanism in the customary manner.
The shaft 17 carries a pair of cams 19 which are duplicates of each other, both as to form and position upon said shaft; these cams coöperate with rollers 20 carried by members 21 movable transversely to the shaft 17 and provided with slots 22ª through which said shaft extends and whereby the transverse movement of said members is rendered possible. The members 21 are pivotally connected at 22 with levers 23 pivoted at 24 to suitable portions of the frame 15; in the preferred arrangement the levers 23 are formed with slots 25 in which the pivots 22 are adjustable, any suitable means, such as the well known lock nuts being provided for fixing the adjustment. The arms 23 each carry a plate or the like 26 between which a stretcher-bar 27 of suitable construction extends, the latter being secured in position in any desired manner; a shaft 28 is journaled upon said plates and carries a driving-roller 29 preferably provided with spurs 30 and having an axial length corresponding approximately to the distance between the two plates 26. The roller 29 accommodates an apron or belt 31 of canvas or other suitable material, which apron passes over the stretcher-bar 27, around idlers 32 journaled upon the plates 26 and over a roller 33 rotatably mounted upon rods or the like 34 preferably in a manner to be adjustable lengthwise thereof; the rods 34 are secured to and extend forwardly from the frame 15 so that a considerable portion of the apron 31 is located in front of the machine proper in an approximately horizontal position, and provides an upper run readily accessible to the operator for the purposes of attaching one or more pelts 35 in position thereon.

In the operation of the machine to be fully described hereinafter, the apron 31 is fed along intermittently in relatively short steps, whereby the pelts are advanced and finally fed over the stretcher-bar 27 to permit the stiff hairs to be cut by the cutting mechanism which will also be fully described hereinafter. Any suitable means may be provided for bringing about said intermittent feed of the apron 31 for instance as shown, one end of the shaft 28 may project beyond the one plate 26 and carry a gear-wheel 36. This gear-wheel 36 meshes with a pinion 37 mounted upon a short shaft 38 which projects from and is journaled upon the same plate 26, a second gear-wheel 39 being also secured upon said shaft 38; said feed mechanism includes a link 40 pivotally mounted upon the shaft 38 in close proximity to the gearwheel 39 and pivotally connected at 41 to one end of a second link 42. The other end of said second link 42 is pivotally connected at 43 either directly with a suitable portion of the frame 15, or as shown, to a bar 43ª rigidly fixed upon said frame, for instance, by means of a bolt 44. The link 40 carries a pawl 45 pivoted at 46 and operatively engaging the gear-wheel 39, a suitable spring 47 serving to maintain said pawl 45 in contact with the teeth of said gear-wheel 39. To prevent unintentional return rotation of the latter, for instance, during the time the pawl 45 partakes of a movement of recovery, a stop-pawl 48 is provided, said stop-pawl being pivoted at 49 upon a lug 50 forming part of or fixed to the plate 26; a spring 51 serves to maintain said stop-pawl 48 in proper engagement with the gear-wheel 39. A pressure-bar 52 is located in front of the apron 31 in register with the stretcher-bar 27 and is carried by arms 53 pivoted at 54 to the plates 26; coil springs 55 each having one end secured to an arm 53 and the other end fastened to a member 56 projecting from each plate 26, are provided for pressing said pressure-bar 52 toward the apron or toward the pelt or pelts 35 carried thereby.

The machine includes further a rotary brush 57 the bristles of which preferably are arranged in rows which extend spirally about said brush 57, the latter being mounted upon a shaft 58 journaled in arms 59 carried by the frame 15, preferably so as to be readily removable therefrom. In order to provide for the adjustability of the brush and to properly locate it with respect to the stretcher-bar 27, the arms 59 may be provided with slots 60 for the accommodation of bolts 61 whereby said arms are secured in an adjusted position upon said frame 15. The brush 57 may be rotatably actuated by means of any suitable mechanism; for instance, as shown, the shaft 58 may carry a sprocket-pinion 62 which is operatively connected, by means of a sprocket chain 63, with a sprocket wheel 64 carried by a shaft 65 adjustable in a slot 66 of the frame 15 any suitable means being provided for maintaining the shaft in its adjusted position. In the illustrated example the sprocket wheel 64 is driven, and thus transmits motion to the sprocket-pinion 62 and brush 57, by means of a sprocket-pinion 67 mounted upon the shaft 65 and meshing with a sprocket chain 68. The latter passes over an idler sprocket 69 journaled upon an arm 70 depending from the shaft 65 and adjustable therewith, the same means whereby said shaft is secured in its adjusted position serving also to fasten said arm in place on the frame 15; the sprocket-chain 68 passes also over a sprocket-wheel 71 secured upon the main driving shaft 17 and constituting the active means whereby motion is transmitted to the brush 57.

As shown in the illustrated example, the machine includes a cutting mechanism comprising a stationary knife 72, carried, for instance, by an inverted T-bar 73, which itself is mounted upon brackets 74 forming part of or secured to the frame 15. In order to permit the knife 72 to be adjusted to various stationary positions, the bar 73 may be provided with slots 75 for the accommodation of bolts 76 whereby said bar and with it the knife are adjustably fastened upon said brackets 74. The cutting mechanism further comprises an oscillating or vibrating knife 77 arranged so as to move in proper correlation to the knife 72 to effect the cutting of the master hairs, as will be more fully explained hereinafter. The vibrating knife 77 is mounted in clamps 78 in which it is held by means of screws 79 the arrangement being such that the knife 77, in its operative position, is somewhat bowed or curved in the direction of its length to facilitate its cutting action in coöperation with the knife 72. The clamps 78 are secured upon a rock-shaft 80 by means of set screws 81, the shaft 80 being journaled in suitable bearings 82 located on the frame 15.

Any suitable means may be utilized for imparting a rocking movement to the shaft 80 to vibrate or oscillate the knife 77; for instance, as shown, an arm 83 is clamped upon the rock-shaft 80 and is pivotally connected at 84 with one end of a link 85, the other end of which is secured to or forms part of a ring 86 surrounding an eccentric 87 loosely mounted upon the main shaft 17; if desired, the arm 83 may be provided with a plurality of apertures for the accommodation of the pivot 84 so that the vibrating knife 77 and its arc of travel may be properly adjusted to meet varying conditions. In order that the eccentric 87 may be operatively coupled to the shaft 17 at will, or when an actuation of the vibrating knife 77 is desired, a suitable clutch is provided. In the machine as illustrated, this clutch comprises a grooved ring 88 loosely mounted upon a bearing 89 which is itself slidably mounted upon said shaft 17, the ring 88 being provided with a pin 90 arranged to be moved into and out of a suitable opening extending transversely through the eccentric 87. The pin 90 is of sufficient length to project completely through the eccentric 87 into a corresponding opening in a clutch member 91 which is fast upon the shaft 17, the opening in the member 91 describing a rotative path whereby it is periodically brought into registry with the opening of the eccentric 87 during the operation of the machine. Thus, when the clutch is thrown in, the pin 90 by extending through the opening of the eccentric 87 into the opening of the member 91, will couple said eccentric 87 and the clutch member 91 altogether whereby said eccentric is caused to partake of the rotative movement of the driving shaft 17.

In order to facilitate the manipulation of the clutch mechanism, a lever 92 is provided, said lever being pivoted at 93 upon a suitable part of the frame 15 and terminating in a fork 94 carrying pins 95 which extend into said grooved ring 88. It will, of course, be understood that, where a continuous vibration of the knife 77 is desired during a given operation of the machine, the eccentric 87 may be fixed upon the shaft 17, in which case the clutch mechanism or its equivalent may be omitted.

In operation power is applied to the pulley 18 through the medium of a belt and suitable driving mechanism, whereby the main shaft 17 is rotated and thus brings about a rotation of the cams 19. Through the medium of the rollers 20 the actuation of said cams 19 causes the members 21 to move transversely of the shaft 17 and thus swings the arms 23 upon the pivots 24. These movements of the arms 23 causes the plates 26 and the stretcher-bar 27 and with them the roller 29, idlers 32 and apron 31, to be also alternately raised and lowered and at the same time causes the gears 36 and 39, pinion 37, stop-pawl 48, link 40 and pawl 45, to also partake of these movements. During the upward movement of the arms 23 and the elements carried thereby and connected therewith, the link 40 is swung toward the left in Fig. 3, through the medium of the link 42 which is pivotally moved in an upward direction on the pivot 43, whereby the pawl 45 describes a movement of recovery relatively to the gear-wheel 39 which is held against movement in one direction by the stop-pawl 48. During the downward movement of said arms, 23, and coöperating elements, which is brought about by gravity, or equivalent means as the cams 19 rotate, the link 42 swings downwardly on the pivot 43 and swings the link 40 to the right in Fig. 3. This causes the pawl 45 to rotate the gear-wheel 39 a distance approximately equal to one tooth, which movement is transmitted to the pinion 37 and gear 36 and thus causes the spur roller 29 to be similarly actuated whereby the apron 31 is intermittently fed along in relatively small steps. In this manner the pelt or pelts 35 which have been previously attached to said apron 31 in the well known way are fed along and are gradually brought over the stretcher-bar 27 as shown for instance in Fig. 5.

At the same time, the described operation of the main shaft 17 also brings about a rotation of the brush 57, through the medium of the sprocket 71, chain 68, pinion 67, sprocket 64, chain 63 and pinion 62, as is clearly shown in Fig. 4.

In addition to the above, assuming the clutch member 91 to be in operative connection with the eccentric 87 through the medium of the pin 90, the rock-shaft 80 will be actuated in its bearings by means of the arm 83 and link 85, which is operated by the eccentric 87. The described movement of the shaft 80 is transmitted to the vibrating knife 77 and causes the same to be oscillated back and forth into and out of coöperative relation with the stationary knife 72. If the clutch mechanism is in its inoperative position, the movement of the main-shaft 17 will have no effect upon the vibrating knife 77 which in this case remains stationary until such time as the clutch mechanism is thrown in through the medium of the hand-lever 92.

As the apron 31 is intermittently fed forward in the manner described, the pelt or pelts 35 therein will pass beneath the pressure bar 52 and, as before stated, will finally reach the stretcher-bar 27 and in the continued operation of the machine will be bent or folded over the same as shown, for instance, in Fig. 7. Thus, when the stretcher-bar 27, through the medium of the cams 19 and coöperating mechanism, is caused to travel upwardly in an arc of a circle having the pivots 24 as a center, the path of travel will carry the pelt or pelts 35 into proximity to the rotating brush 57 in about the relation shown in Fig. 7. As the machine continues to operate the pelt or pelts 35 will be carried along in contact with the rotating brush 57 in about the manner indicated in Fig. 8; during this stage of the operation the action of the brush 57 causes the soft hairs or fur to be brushed down more or less flat, as indicated diagrammatically in Fig. 8, the action of the brush being facilitated because of the arrangement of the bristles in spiral circumferential rows. The path of travel of the stretcher-bar 27 is such that the pelts are subjected to the brushing effect of the brush 57 for a sufficient length of time to cause the soft hairs or fur to remain in the flattened condition, said fur or hairs being relatively soft and inelastic. The continued operation of the mechanism finally carries the stretcher-bar 27 and with it the pelts 35 beyond the brush 57; as soon as this happens those master or stiff hairs $a$ located along the bend of the pelt in registry with the stretcher-bar and which have been held down by said brush 57, spring up into an upright position because of their inherent stiffness and elasticity. After the pelts have been moved beyond the brush 57, as described, the continued path of travel of the stretcher-bar 27 is such as to bring said pelts 35 with the master hairs $a$ standing upright, into coöperative proximity to the stationary knife 72, as shown in Fig. 9; in this position the knife 72 practically rests upon the skin of the pelt and thus protects those parts of the pelts which have not yet passed over the stretcher-bar as well as that part of the pelt which is folded over said bar, against injury from the cutting mechanism and at the same time brings the cutting edge of the knife 72 into position adjacent to the lower portions of the stiff hairs a, as shown in Fig. 9.

The hand lever 92 is now actuated to couple the eccentric 87 to the clutch member 91 through the medium of the pin 90, thus causing an oscillation of the vibrating knife 77 and bringing its cutting edge into coöperative relation with the cutting edge of the stationary knife 72 whereby such master hairs a as occupy upright positions along the bend or fold of the pelt or pelts 35 upon the stretcher-bar 27 are clipped or cut off close to the skin of said pelt or pelts. It will, of course, be apparent that the actuation of the lever 92 will be necessary only if the eccentric is not coupled to the shaft 17 at the time the cutting action of the knives is desired. As illustrated diagrammatically, the cutting of the master hairs a is such as to remove practically the entire hairs and is accomplished without danger of injury to the skin of the pelt or to the soft fur.

As the parts describe the various return movements, or in other words as the support comprising the arms 23 and plates 26 together with the stretcher-bar 27 carried thereby and connected parts moves downwardly, the pawl 45, by the action of the link 40 and link 42, will feed the gear-wheel 39 and, consequently, the roller 29, forward to a relatively slight extent, thus advancing the apron 31 and bringing another portion of the pelt or pelts 35 over the stretcher-bar 27 whereupon the operations previously described are repeated.

The feed of the apron 31 is in short steps whereby every portion of the pelt or pelts is successively brought over the stretcher-bar 27 and permitted to remain there long enough to insure the cutting off of such major or stiff hairs as may be present.

It will be seen, with our improved machine, that the pelt is moved in a circular path toward and away from the cutting mechanism and that during such travel it passes and is subjected to the action of the rotary brush which, excepting for its rotative movement, is stationary; the fur or soft hair is, in this way, efficiently brushed down to fully expose the master hairs which have ample opportunity to spring up into upright positions before the cutting mechanism is reached. Furthermore, the pelt or pelts are efficiently fed during the movement away from the cutting mechanism, so that every portion thereof is successively positioned upon the stretcher-bar and all master hairs are exposed and brought to positions in which they are efficiently cut and removed. During the return movement of the parts, the pelts again pass in contact with the brush which thus serves to remove or brush away any cut or severed hairs which may cling to the fur.

With our improved construction, the apron 31 is brought to a position of ready accessibility to the operator so that the pelts may be attached thereto with a minimum of effort, and furthermore may be made of sufficient width to accommodate two or more pelts located alongside of each other.

Our machine is extremely simple in construction and efficient in operation and requires no particularly skilled attention; it is adapted for unhairing the skins of substantially all fur-bearing animals and is particularly adapted for removing the master hairs from the pelts of muskrat and similar animals.

Various changes in the specific form shown and described may be made within the scope of the claims without departing from the scope of our invention.

We claim:—

1. In an unhairing machine, the combination of cutting mechanism, a stretcher-bar movable in a circular path, an apron whereby the pelt is fed over said stretcher-bar, a rotating brush revolving about a stationary axis and located at an intermediate point in the path described by the pelt while on said stretcher-bar, and means for moving said stretcher-bar in said circular path to bring said pelt first into contact with said brush, then beyond the same into coöperative relation with said cutting mechanism.

2. In an unhairing machine, the combination of pivoted arms, a stretcher-bar carried thereby, members pivotally connected with said arms, cams whereby said members are actuated in the direction of their length to pivotally swing said arms and move said stretcher-bar in a circular path, an apron whereby the pelt is fed over the stretcher-bar, cutting mechanism at the one terminus of said circular path, a rotating brush revolving about a stationary axis and located at an intermediate point of said circular path whereby the pelt is engaged by said brush in passing to the cutting mechanism and feed mechanism actuated during the return movement of said stretcher-bar away from said cutting mechanism whereby said apron is advanced to feed said pelt over said stretcher-bar.

3. An unhairing machine comprising a frame, a main driving shaft journaled thereon, a stationary knife, a rotatable brush, means operatively connected with said main shaft whereby said brush is rotated about a stationary axis, a support pivoted upon said frame, a stretcher-bar carried by said support and movable in a circular path, an apron whereby the pelt is passed over said stretcher-bar, cams carried by said main shaft whereby said pivoted support is pivotally swung to move said stretcher-bar in said circular path toward and away from said stationary knife and to move said pelt beyond said brush into coöperative relation with said stationary knife, the pelt contacting with said brush in passing over said circular path to said knife, feed mechanism actuated during the movement of said stretcher-bar away from said stationary knife whereby said apron is advanced to feed said pelt over said stretcher bar, an oscillating knife coöperating with said stationary knife to exert a cutting action and means connected with said main shaft for actuating said oscillating knife.

In testimony whereof we have hereunto set our hands.

CHARLES REINHART MISCHKE.
REINHARDT CHARLES MISCHKE.

Witness:
FRANK J. MILLS.